(12) United States Patent
Nakayama et al.

(10) Patent No.: US 11,387,048 B2
(45) Date of Patent: Jul. 12, 2022

(54) SOLID ELECTROLYTIC CAPACITOR

(71) Applicant: Panasonic Intellectual Property Management Co., Ltd., Osaka (JP)

(72) Inventors: Takuya Nakayama, Osaka (JP); Natsuki Hatakeyama, Kyoto (JP); Katsuhisa Ishizaki, Kyoto (JP); Hitoshi Fukui, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/089,710

(22) Filed: Nov. 4, 2020

(65) Prior Publication Data

US 2021/0050158 A1 Feb. 18, 2021

Related U.S. Application Data

(63) Continuation of application No. PCT/JP2019/020661, filed on May 24, 2019.

(30) Foreign Application Priority Data

May 29, 2018 (JP) .............................. JP2018-102841

(51) Int. Cl.
| | |
|---|---|
| *H01G 9/15* | (2006.01) |
| *H01G 9/012* | (2006.01) |
| *H01G 9/028* | (2006.01) |
| *H01G 9/07* | (2006.01) |
| *H01G 9/08* | (2006.01) |

(52) U.S. Cl.
CPC .............. *H01G 9/15* (2013.01); *H01G 9/012* (2013.01); *H01G 9/028* (2013.01); *H01G 9/07* (2013.01); *H01G 9/08* (2013.01)

(58) Field of Classification Search
CPC .............. H01G 9/08; H01G 4/32; H01G 9/15
See application file for complete search history.

(56) References Cited

U.S. PATENT DOCUMENTS

| | | | |
|---|---|---|---|
| 2002/0001169 A1 | 1/2002 | Shiraishi et al. | |
| 2011/0157776 A1* | 6/2011 | Ishida ...................... | H01G 9/15 361/524 |

(Continued)

FOREIGN PATENT DOCUMENTS

| | | |
|---|---|---|
| JP | 54-010964 | 1/1979 |
| JP | 64-012518 | 1/1989 |

(Continued)

OTHER PUBLICATIONS

International Search Report of PCT application No. PCT/JP2019/020661 dated Jul. 30, 2019.

*Primary Examiner* — Eric W Thomas
(74) *Attorney, Agent, or Firm* — McDermott Will & Emery LLP

(57) ABSTRACT

A solid electrolytic capacitor includes at least one capacitor element, an outer packaging resin, and a coating layer. The at least one capacitor element includes an anode body that includes a dielectric layer, and a solid electrolyte layer that at least partially covers the dielectric layer. The outer packaging resin covers the at least one capacitor element. The coating layer is disposed between the at least one capacitor element and the outer packaging resin. The coating layer contains a fluorine compound.

26 Claims, 3 Drawing Sheets

(56) References Cited

U.S. PATENT DOCUMENTS

| | | | |
|---|---|---|---|
| 2012/0194968 A1* | 8/2012 | Kuromi | H01G 11/56 361/528 |
| 2015/0092319 A1* | 4/2015 | Tatsuno | H01G 9/028 361/525 |
| 2016/0189872 A1* | 6/2016 | Naito | H01G 9/012 361/528 |
| 2017/0221637 A1* | 8/2017 | Ning | H01G 9/0032 |

FOREIGN PATENT DOCUMENTS

| | | |
|---|---|---|
| JP | 2002-319522 | 10/2002 |
| JP | 2007-194310 | 8/2007 |
| JP | 2008-004583 | 1/2008 |
| JP | 2010-225696 | 10/2010 |

\* cited by examiner

SOLID ELECTROLYTIC CAPACITOR

RELATED APPLICATIONS

This application is a continuation of the PCT International Application No. PCT/JP2019/020661 filed on May 24, 2019, which claims the benefit of foreign priority of Japanese patent application No. 2018-102841 filed on May 29, 2018, the contents all of which are incorporated herein by reference.

BACKGROUND

1. Technical Field

The present disclosure generally relates to a solid electrolytic capacitor and, more particularly, to a solid electrolytic capacitor including an outer packaging resin that covers a capacitor element.

2. Description of the Related Art

Unexamined Japanese Patent Publication No. 2007-194310 discloses a solid electrolytic capacitor having a capacitor element, a barrier layer, and an outer packaging resin (resin package). The barrier layer is constituted by sequentially stacking a coating layer, an inorganic material layer formed by a vapor phase growth method, and/or a metal layer on a capacitor element. The outer packaging resin covers the capacitor element and the barrier layer. In this solid electrolytic capacitor, the barrier layer prevents moisture and oxygen from entering from the outside to stabilize the characteristics.

SUMMARY

A solid electrolytic capacitor according to an aspect of the present disclosure includes at least one capacitor element, an outer packaging resin, and a coating layer. The at least one capacitor element includes an anode body that includes a dielectric layer, and a solid electrolyte layer that at least partially covers the dielectric layer. The outer packaging resin covers the at least one capacitor element. The coating layer is disposed between the capacitor element and the outer packaging resin. The coating layer contains at least a fluorine compound.

A solid electrolytic capacitor according to another aspect of the present disclosure includes at least one capacitor element, an outer packaging resin, and a coating layer. The at least one capacitor element includes an anode body that includes a dielectric layer, and a solid electrolyte layer that at least partially covers the dielectric layer. The outer packaging resin covers the at least one capacitor element. The coating layer is disposed between the capacitor element and the outer packaging resin. The coating layer has oil repellency.

According to the present disclosure, there is an advantage that it is possible to provide a solid electrolytic capacitor in which a characteristic change in a capacitor element hardly occurs.

DETAILED DESCRIPTION OF EMBODIMENT

In the configuration disclosed in Unexamined Japanese Patent Publication No. 2007-194310, the outer packaging resin covers the capacitor element together with the barrier layer. Thus, when the outer packaging resin contains a wax component, the wax component may infiltrate the barrier layer and be brought into contact with the capacitor element. For example, in a case where the solid electrolytic capacitor is exposed to a high-temperature environment with the wax component in contact with the capacitor element, or in some other case, a characteristic change in the capacitor element may occur due to the influence of the heated wax component.

The present disclosure has been made in view of the above reasons and provides a solid electrolytic capacitor in which a characteristic change in a capacitor element hardly occurs.

First Exemplary Embodiment

(1) Outline

Figure 1:
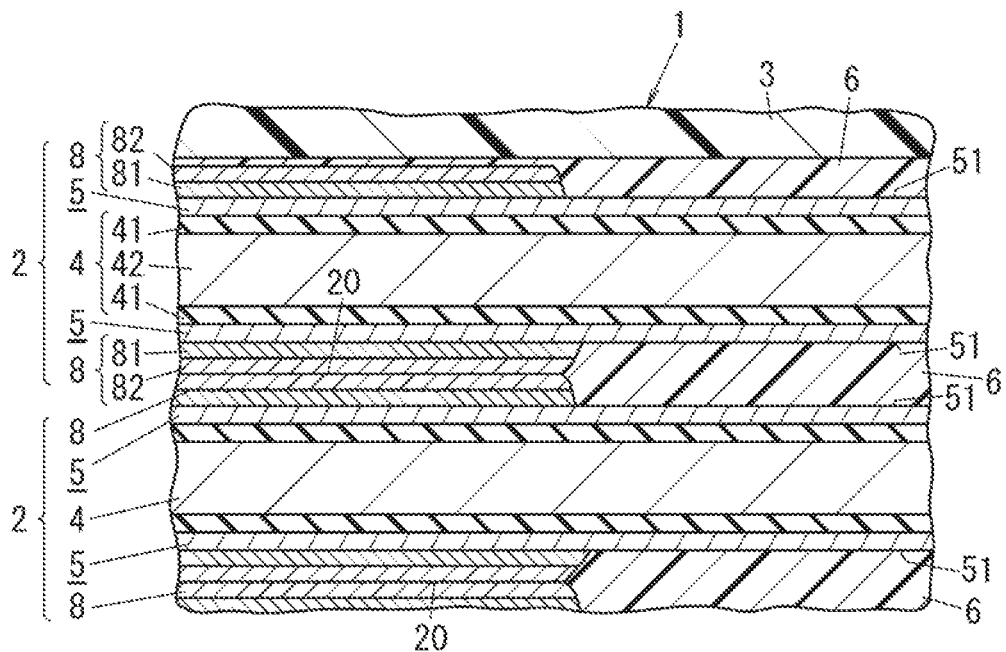
FIG. 1 is a schematic cross-sectional view of a main part which illustrates a configuration of a solid electrolytic capacitor according to a first exemplary embodiment.
Figure 2:
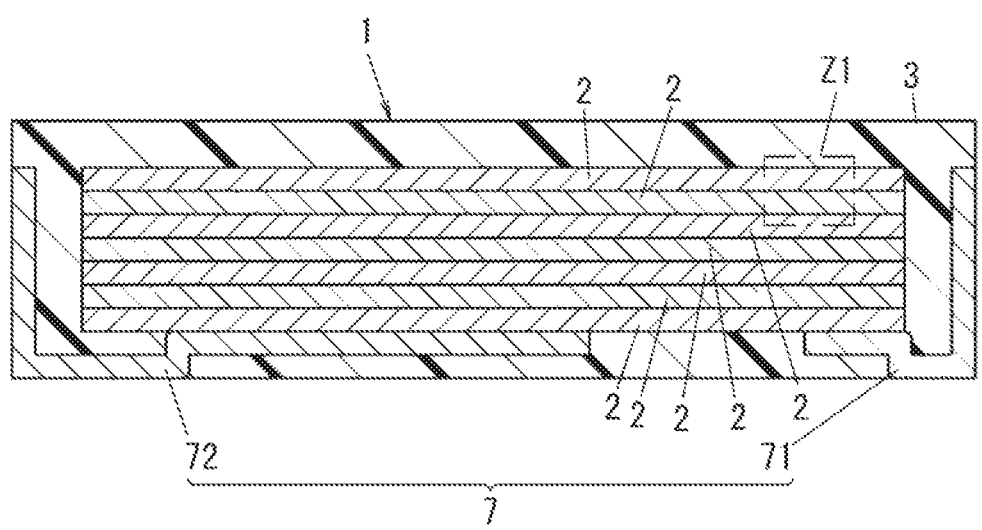
FIG. 2 is a schematic cross-sectional view illustrating the configuration of the solid electrolytic capacitor according to the first exemplary embodiment.

As illustrated in FIG. 2, solid electrolytic capacitor (electrolytic capacitor) 1 according to the present exemplary embodiment includes at least one capacitor element 2 and outer packaging resin 3. As illustrated in FIG. 1, capacitor element 2 has an anode body 4 and solid electrolyte layer 5. Anode body 4 includes dielectric layer 41. Solid electrolyte layer 5 at least partially covers dielectric layer 41. Outer packaging resin 3 covers capacitor element 2. FIG. 1 is an enlarged schematic cross-sectional view of area Z1 in FIG. 2.

In solid electrolytic capacitor 1 having such a configuration, since capacitor element 2 is covered with outer packaging resin 3, capacitor element 2 is hardly affected by force acting on solid electrolytic capacitor 1 from the outside of solid electrolytic capacitor 1, temperature, humidity, or the like, and the characteristic change in capacitor element 2 can be reduced. However, when outer packaging resin 3 contains oil such as wax component 300 (see FIG. 4A), the characteristic change in capacitor element 2 may occur due to the influence of wax component 300.

Thus, solid electrolytic capacitor 1 according to the present exemplary embodiment further includes coating layer 6 containing a fluorine compound. Coating layer 6 is disposed between capacitor element 2 and outer packaging resin 3. Here, coating layer 6 only needs to be disposed between capacitor element 2 and outer packaging resin 3. In other words, it is not an essential configuration for solid electrolytic capacitor 1 that coating layer 6 covers the entire surface of capacitor element 2 or the entire surface of coating layer 6 is covered with outer packaging resin 3.

With the configuration described above, due to coating layer 6 disposed between capacitor element 2 and outer packaging resin 3, it becomes difficult for the oil, such as wax component 300, contained in outer packaging resin 3 to be brought into contact with capacitor element 2 as compared to the configuration without coating layer 6. That is, coating layer 6 containing the fluorine compound makes it difficult for the oil content, such as wax component 300, to infiltrate from outer packaging resin 3 into capacitor element 2. Hence, for example, in a case where solid electrolytic capacitor 1 is exposed to a high-temperature environment or in some other case, even if the oil content in outer packaging resin 3 is heated to a high temperature, the oil content hardly affects capacitor element 2, and thus the characteristic change in capacitor element 2 hardly occurs.

(2) Details

Figure 3:
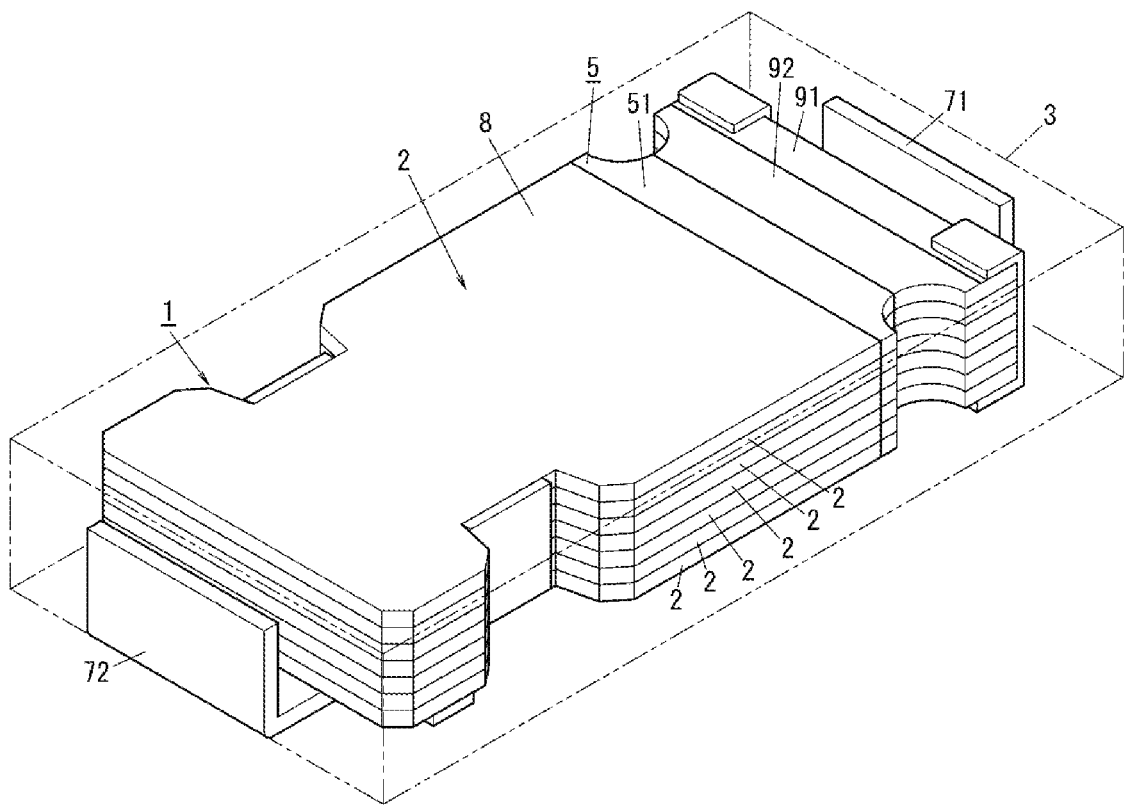
FIG. 3 is a schematic perspective view illustrating the configuration of the solid electrolytic capacitor according to the first exemplary embodiment.

Hereinafter, the configuration of solid electrolytic capacitor 1 according to the present exemplary embodiment will be described in more detail with reference to FIGS. 1 to 3. In FIG. 3, an imaginary line (dotted and dashed line) indicates outer packaging resin 3. All the drawings referred to below are schematic views, and the ratio of the size and thickness of each component in the drawings does not necessarily reflect an actual dimension ratio.

Solid electrolytic capacitor 1 according to the present exemplary embodiment is used, as an example, in a power supply line of a central processing unit (CPU) such as a server device, a computer device, and a home game machine. In addition, solid electrolytic capacitor 1 is used, for example, for a power supply line of a field-programmable gate array (FPGA) in, for example, a communication device and an industrial device, a power supply line of a graphics processing unit (GPU) such as a graphic board, and the like. Meanwhile, the use of solid electrolytic capacitor 1 is not limited to these, and solid electrolytic capacitor 1 can be used in various fields.

As illustrated in FIGS. 2 and 3, solid electrolytic capacitor 1 further includes terminal part 7 in addition to at least one capacitor element 2, outer packaging resin 3, and coating layer 6. Terminal part 7 includes first terminal 71 for an anode and second terminal 72 for a cathode. Capacitor element 2 further includes cathode layer 8 in addition to anode body 4 and solid electrolyte layer 5. Cathode layer 8 is disposed on the surface of capacitor element 2 so as to cover solid electrolyte layer 5 at least partially. First terminal 71 is electrically connected to anode-side conductive part 42 (see FIG. 1) of anode body 4, and second terminal 72 is electrically connected to cathode-side conductive part 82 (see FIG. 1) of cathode layer 8. This makes (anode-side conductive part 42 of) anode body 4 and (cathode-side conductive part 82 of) cathode layer 8 of capacitor element 2 electrically connectable to an external circuit at first terminal 71 and second terminal 72, respectively.

In the present exemplary embodiment, first terminal 71 and second terminal 72, which constitute terminal part 7, are made of a conductive metal plate (lead frame). Each of first terminal 71 and second terminal 72 is embedded in outer packaging resin 3 so as to be at least partially exposed from the surface of outer packaging resin 3. That is, solid electrolytic capacitor 1 according to the present exemplary embodiment is a chip component (chip capacitor) corresponding to the surface-mount technology for mechanically and electrically connecting terminal part 7 (first terminal 71 and second terminal 72), exposed from the surface of outer packaging resin 3, to the circuit board by soldering or the like.

Here, solid electrolytic capacitor 1 according to the present exemplary embodiment includes a plurality of capacitor elements 2. The plurality of capacitor elements 2 are covered with one outer packaging resin 3 while the plurality of capacitor elements 2 are stacked to each other. Each of the plurality of capacitor elements 2 includes anode body 4, solid electrolyte layer 5, and cathode layer 8. As illustrated in FIG. 3, each of the plurality of capacitor elements 2 is formed in a plate shape having a substantially rectangular shape when viewed from one side in the thickness direction. In this way, the plurality of capacitor elements 2 each formed in the plate shape are stacked so as to overlap each other in the thickness direction. In the present disclosure, a direction in which capacitor elements 2 are stacked is also referred to as "stacking direction." In the present exemplary embodiment, as an example, solid electrolytic capacitor 1 includes seven capacitor elements 2, and those seven capacitor elements 2 are stacked such that the thickness direction of each capacitor element 2 is the stacking direction.

That is, solid electrolytic capacitor 1 includes a structure (stack) in which the plurality of capacitor elements 2 having the same configuration are stacked in the stacking direction, and each of the plurality of capacitor elements 2 constitutes a capacitor. The plurality of capacitor elements 2 are electrically connected in parallel between first terminal 71 and second terminal 72. Thereby, as entire solid electrolytic capacitor 1, an electric resistance value between the two terminals (first terminal 71 and second terminal 72) can be held relatively low.

More specifically, as illustrated in FIG. 3, when each capacitor element 2 is viewed from one side in the thickness direction (stacking direction), anode drawing part 91, insulator 92, exposed area 51 (described later), and cathode layer 8 are disposed in order from one end (right end in the example of FIG. 2) in the longitudinal direction in the surface of each capacitor element 2. Anode drawing part 91, insulator 92, and exposed area 51 are each formed in a belt-like shape. Anode drawing part 91 is a region for connecting first terminal 71 and is configured by partially exposing anode-side conductive part 42 from dielectric layer 41. That is, by first terminal 71 being connected to anode drawing part 91, first terminal 71 and anode-side conductive part 42 of anode body 4 are connected electrically. Second terminal 72 is connected to cathode layer 8.

Further, in the present exemplary embodiment, solid electrolyte layer 5 in capacitor element 2 contains a conductive polymer. The conductive polymer is polypyrrole (PPy), polyethylenedioxythiophene (PEDOT), or polyaniline, as an example. That is, in solid electrolytic capacitor 1 according to the present exemplary embodiment, a conductive polymer is used as the solid electrolyte instead of manganese dioxide or the like.

Solid electrolytic capacitor 1 having the configuration as described above can hold equivalent series resistance (ESR) low and can achieve excellent low ESR performance.

Hereinafter, anode body 4, solid electrolyte layer 5, and cathode layer 8 constituting each capacitor element 2 will be described in detail with reference to FIG. 1.

Anode body 4 includes dielectric layer 41 and anode-side conductive part 42. Anode-side conductive part 42 has a flat plate shape. Dielectric layer 41 is formed on at least one surface in the thickness direction of anode-side conductive part 42. Anode-side conductive part 42 is a region functioning as an anode in each capacitor element 2 and is made of a metal plate having conductivity. Dielectric layer 41 is formed so as to cover substantially the entire surface of anode-side conductive part 42, more specifically, at least in a portion of the surface of anode-side conductive part 42 on which solid electrolyte layer 5 is formed. Thus, in the present exemplary embodiment, dielectric layer 41 is formed not only on one surface of anode-side conductive part 42 in the thickness direction but also on both surfaces of anode-side conductive part 42 in the thickness direction.

Specifically, anode body 4 includes a valve metal. Examples of the valve metal include aluminum, tantalum, niobium, titanium, hafnium, zirconium, zinc, tungsten, bismuth, antimony, and the like, and alloys containing these metals. In the present exemplary embodiment, as an example, the valve metal contained in anode body 4 is aluminum. That is, anode-side conductive part 42 is a metal plate (metal foil) made of aluminum (Al). A film of aluminum oxide ($Al_2O_3$), which is an oxide of aluminum, is formed on the surface of anode-side conductive part 42, and the film constitutes dielectric layer 41.

Solid electrolyte layer 5 is formed on the surface of anode body 4. Solid electrolyte layer 5 is not formed directly on anode-side conductive part 42 but is formed on dielectric layer 41. That is, solid electrolyte layer 5 is stacked on anode-side conductive part 42 via dielectric layer 41. Solid electrolyte layer 5 is formed so as to cover substantially the entire surface of anode body 4 except for anode drawing part 91 (see FIG. 3) and insulator 92. Thus, in the present exemplary embodiment, solid electrolyte layer 5 is formed not only on one surface of anode body 4 in the thickness direction but also on both surfaces of anode body 4 in the thickness direction.

In the present exemplary embodiment, solid electrolyte layer 5 contains a conductive polymer as described above. Solid electrolyte layer 5, made of the conductive polymer, has electric conductivity mainly by electron conduction, so that ESR can be reduced as compared to the electrolyte having electric conductivity by ion conduction.

Cathode layer 8 includes cathode-side conductive part 82 and carbon layer 81. Carbon layer 81 is formed directly on the surface of solid electrolyte layer 5. Cathode-side conductive part 82 is formed on the surface of carbon layer 81. Cathode-side conductive part 82 is made of a metal layer having conductivity. Cathode-side conductive part 82 is made of a silver (Ag) paste film, as an example. Here, cathode layer 8 at least partially covers solid electrolyte layer 5. In the present exemplary embodiment, cathode layer 8 only partially covers the surface of solid electrolyte layer 5, not the entire surface of solid electrolyte layer 5. In other words, solid electrolyte layer 5 includes exposed area 51 that is not covered with cathode layer 8. That is, a part of solid electrolyte layer 5 is not covered with cathode layer 8 but is exposed from cathode layer 8 as exposed area 51. In the present exemplary embodiment, an area of solid electrolyte layer 5 having a certain width from the end edge closer to insulator 92 is exposed area 51.

Cathode layer 8 is formed so as to cover substantially the entire surface of solid electrolyte layer 5 except for exposed area 51. Thus, in the present exemplary embodiment, cathode layer 8 is formed on the surface of solid electrolyte layer 5 not only on one side of anode body 4 in the thickness direction but also on both sides of anode body 4 in the thickness direction.

With the configuration described above, as illustrated in FIG. 1, each capacitor element 2 is formed by stacking solid electrolyte layer 5 and cathode layer 8 in this order on each of both sides of anode body 4 in the thickness direction (stacking direction). More specifically, dielectric layer 41, solid electrolyte layer 5, carbon layer 81, and cathode-side conductive part 82 are stacked in this order on each of both sides of anode-side conductive part 42 in the thickness direction (stacking direction) to constitute capacitor element 2.

Solid electrolytic capacitor 1 according to the present exemplary embodiment includes the plurality of capacitor elements 2 having the above configuration, and the plurality of capacitor elements 2 are stacked and integrated in the thickness direction (stacking direction) of each capacitor element 2. A pair of capacitor elements 2 adjacent to each other among the plurality of capacitor elements 2 are joined at junction portion 20. In the present exemplary embodiment, among the plurality of capacitor elements 2 stacked in the stacking direction, a pair of capacitor elements 2 adjacent to each other are electrically and mechanically connected between cathode-side conductive parts 82 in the respective cathode layers 8. That is, junction portion 20 joins cathode-side conductive parts 82 in cathode layers 8 of the pair of capacitor elements 2 adjacent in the stacking direction. As an example, junction portion 20 is achieved by a conductive adhesive that joins (cathode-side conductive parts 82 of) cathode layers 8 to each other.

Outer packaging resin 3 is a resin member for covering capacitor element 2 having the configuration described above. Since solid electrolytic capacitor 1 according to the present exemplary embodiment includes the plurality of capacitor elements 2, outer packaging resin 3 covers the entire structure (stack) in which the plurality of capacitor elements 2 are stacked and integrated in the stacking direction. By covering capacitor elements 2, outer packaging resin 3 prevents stress, moisture, oxygen, and the like from acting on capacitor element 2 from the outside. In the present exemplary embodiment, as an example, outer packaging resin 3 is made of an epoxy resin.

Figure 4A:
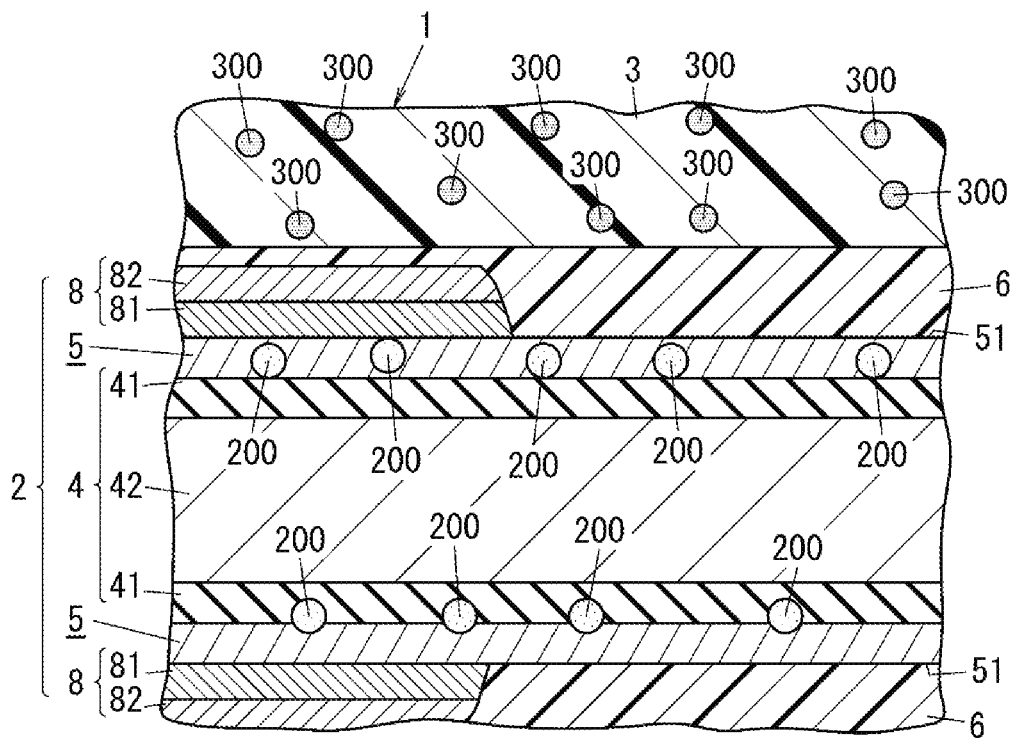
FIG. 4A is an explanatory view schematically illustrating a wax component in an outer packaging resin of the solid electrolytic capacitor according to the first exemplary embodiment.

Here, outer packaging resin 3 contains wax component 300 (see FIG. 4A). The term "wax" in the present disclosure is an oily substance with a high melting point, which refers to an ester of a higher fatty acid with a monohydric or dihydric higher alcohol, and a neutral fat, a higher fatty acid, a hydrocarbon, and the like which exhibit similar properties. Examples of wax component 300 contained in outer packaging resin 3 include carnauba wax, montanic acid ester, and the like. These wax components 300 each have, for example, a function of improving mold releasability at the time of molding outer packaging resin 3, a function of polishing outer packaging resin 3, and the like.

As described above, coating layer 6 is disposed between capacitor element 2 and outer packaging resin 3. Coating layer 6 is made of a fluorine compound such as a resin containing fluorine. Coating layer 6 contains a perfluoroalkyl methacrylate, a perfluoroalkyl acrylate, a perfluoropolyether group-containing silane compound, or the like, as an example. The fluorine compound includes, for example, one or a plurality of polytetrafluoroethylene (PTFE), tetrafluoroethylene-perfluoroalkylvinyl ether copolymer (PFA), ethylene-tetrafluoroethylene copolymer (ETFE), tetrafluoroethylene-hexafluoropropylene copolymer (FEP), polychlorotrifluoroethylene (PCTFE), ethylene-chlorotrifluoroethylene copolymer (ECTFE), polyvinylidene fluoride (PVDF), polyvinyl fluoride (PVF), perfluoroalkyltrialkoxysilane, and the like.

As illustrated in FIG. 1, coating layer 6 is formed on the surface of capacitor element 2 so as to cover capacitor element 2. In the present exemplary embodiment, coating layer 6 covers at least exposed area 51. In short, coating layer 6 is formed on the surface of capacitor element 2 so as to cover an area of solid electrolyte layer 5 not covered with cathode layer 8 but exposed from cathode layer 8 as exposed area 51. Meanwhile, in the present exemplary embodiment, coating layer 6 is formed from exposed area 51 to cathode layer 8 so as to also cover (cathode-side conductive part 82 of) cathode layer 8 of capacitor element 2. The thickness of coating layer 6 is, as an example, less than or equal to 5 μm, more preferably less than or equal to 3 μm or less.

In the present exemplary embodiment, coating layer 6 is formed at least partially in an area of the surface of each of the plurality of capacitor elements 2, the area excluding junction portion 20. In other words, coating layer 6 is not formed on junction portion 20 but is formed so as to avoid junction portion 20. As described above, junction portion 20 joins the pair of capacitor elements 2 adjacent to each other among the plurality of capacitor elements 2, and in the present exemplary embodiment, cathode-side conductive parts 82 in cathode layers 8 of the pair of capacitor elements 2 are joined to each other. Thus, coating layer 6 is formed so as to avoid junction portion 20 that joins (cathode-side conductive parts 82 of) cathode layers 8 to each other.

In the present exemplary embodiment, coating layer 6 is disposed at least partially between the pair of capacitor elements 2 adjacent to each other among the plurality of capacitor elements 2. In other words, coating layer 6 also exists in a gap between the plurality of capacitor elements 2 stacked in the stacking direction (see FIG. 1).

With coating layer 6 containing the fluorine compound, as an example, the oil repellency of coating layer 6 makes it difficult for wax component 300 to infiltrate from outer packaging resin 3 into capacitor element 2. In the present exemplary embodiment, coating layer 6 has oil repellency with a contact angle greater than or equal to 50 degrees. Specifically, when a droplet (oil droplet) of n-hexadecane is attached to the surface of coating layer 6, the static contact angle of coating layer 6 with respect to the droplet of n-hexadecane, that is, the oil contact angle of coating layer 6, is greater than or equal to 50 degrees.

Coating layer 6 does not need to contain the fluorine compound so long as having the oil repellency. That is, as an example, coating layer 6 can also be achieved by resin having oil repellency, such as silicone resin. Even coating layer 6 containing no fluorine compound preferably has oil repellency with a contact angle greater than or equal to 50 degrees. Coating layer 6 having the oil repellency makes it difficult for wax component 300 to infiltrate from outer packaging resin 3 into capacitor element 2. Coating layer 6 more preferably contains the fluorine compound and has the oil repellency.

(3) Manufacturing Method

Next, a manufacturing method for solid electrolytic capacitor 1 according to the present exemplary embodiment will be described. Solid electrolytic capacitor 1 according to the present exemplary embodiment is basically manufactured by the following procedure. That is, the manufacturing method for solid electrolytic capacitor 1 includes steps of anode body preparation, anodization of the anode body, formation of a solid electrolyte layer, cathode application, element stacking, anode welding, resin molding, and terminal processing.

First, in the anode body preparation step, punching or the like is performed on a metal plate (aluminum in the present exemplary embodiment) with a surface having an oxide film that constitutes dielectric layer 41, to form a base material forming anode body 4 of each capacitor element 2. In the anodization step, dielectric layer 41 is restored with respect to the base material. In the formation step of a solid electrolyte layer, the conductive polymer constituting solid electrolyte layer 5 is formed with respect to the base material. At this time, a conductive polymer (solid electrolyte layer 5) is formed on the surface of the base material (anode body 4) by using a solution containing the conductive polymer or the raw material of the conductive polymer. In the cathode application step, carbon and silver paste are sequentially applied on the surface of solid electrolyte layer 5 on the base material to form cathode layer 8 (carbon layer 81 and cathode-side conductive part 82). Thus, each capacitor element 2 is completed.

Next, in the element stacking step, the plurality of capacitor elements 2 are stacked in the stacking direction, and cathode layers 8 of the pair of capacitor elements 2 adjacent to each other are joined to each other with a conductive adhesive that constitutes junction portion 20. At this time, the plurality of capacitor elements 2 are stacked on a conductive metal plate (lead frame) constituting first terminal 71 and second terminal 72. In the anode welding process, first terminal 71 is electrically and mechanically connected to anode drawing part 91 by welding.

In the subsequent resin molding step, outer packaging resin 3 is formed by transfer molding so as to cover a structure (stack) in which capacitor elements 2 are stacked and integrated in the stacking direction. At this time, outer packaging resin 3 is molded such that each of first terminal 71 and second terminal 72 is partially exposed from the surface of outer packaging resin 3. In the terminal processing step, the lead frame is divided into individual pieces, and first terminal 71 and second terminal 72 are bent. Thus, solid electrolytic capacitor 1 is completed.

The manufacturing method for solid electrolytic capacitor 1 according to the present exemplary embodiment further includes a resin coating step of forming coating layer 6 containing the fluorine compound or having the oil repellency. The resin coating step is performed before the resin molding step and after any of the cathode application, element stacking, and anode welding steps. In the present exemplary embodiment, as an example, the resin coating step is performed after the anode welding step. In the resin coating step, a resin material containing a fluorine compound or having oil repellency is applied on the surface of the structure (stack) in which capacitor elements 2 are stacked and integrated in the stacking direction, to form coating layer 6.

By the formation of coating layer 6 after the stacking step, as described above, coating layer 6 is formed at least partially in an area of the surface of each of the plurality of capacitor elements 2, the area excluding junction portion 20. That is, coating layer 6 is not formed on junction portion 20 but is formed so as to avoid junction portion 20. Further, in the resin coating step, the resin material containing fluorine or having oil repellency is applied on capacitor element 2 so as to go around a gap between the stacked capacitor element 2. Thereby, coating layer 6 is formed at least partially between the pair of capacitor elements 2 adjacent to each other among the plurality of capacitor elements 2.

The manufacturing method for solid electrolytic capacitor 1 may further include a drying step of capacitor element 2. The drying step of capacitor element 2 is performed before the resin molding step and after any of the cathode application, element stacking, and anode welding steps. In the drying step, for example, capacitor element 2 is placed in a high-temperature atmosphere (e.g., 200° C.) for a predetermined time to reduce the content of moisture 200 (see FIG. 4A) in capacitor element 2. By including the drying step in the manufacturing method for solid electrolytic capacitor 1, the content of moisture 200 in capacitor element 2 can be reduced as compared to a case where the drying step is not included.

(4) Comparative Example

Figure 4B:
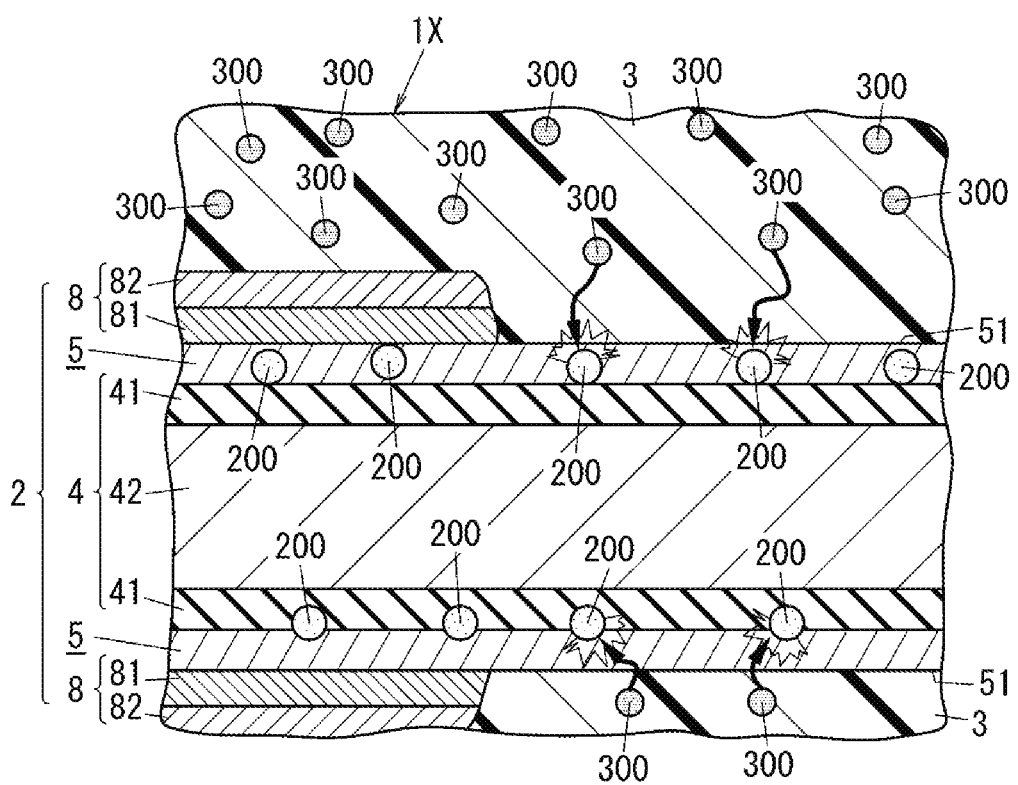
FIG. 4B is an explanatory view schematically illustrating a wax component in an outer packaging resin of a solid electrolytic capacitor according to a comparative example.

Next, with reference to FIGS. 4A and 4B, comparison results between solid electrolytic capacitor 1 according to the present exemplary embodiment and solid electrolytic capacitor 1X according to a comparative example will be described. Solid electrolytic capacitor 1X according to the comparative example has the same configuration as that of solid electrolytic capacitor 1 according to the present exemplary embodiment except that coating layer 6 is not provided. FIGS. 4A and 4B schematically illustrate wax component 300 contained in outer packaging resin 3 and moisture 200 contained in capacitor element 2. In the following, it is assumed that solid electrolytic capacitors 1, 1X are exposed to a high-temperature (e.g., 125° C.) environment in the resin molding step of molding outer packaging resin 3 or in the use of solid electrolytic capacitors 1, 1X.

In solid electrolytic capacitor 1X according to the comparative example, as illustrated in FIG. 4B, since coating layer 6 does not exist between capacitor element 2 and outer packaging resin 3, wax component 300 contained in outer packaging resin 3 is easily brought into contact with capacitor element 2 as compared to solid electrolytic capacitor 1 according to the present exemplary embodiment. That is, coating layer 6 for preventing the infiltration of wax component 300 from outer packaging resin 3 into capacitor element 2 does not exist between capacitor element 2 and outer packaging resin 3, whereby wax component 300 easily infiltrates into capacitor element 2 as compared to solid electrolytic capacitor 1. Hence, when solid electrolytic capacitor 1X is exposed to a high-temperature environment and wax component 300 is heated to a high temperature, moisture 200 contained in capacitor element 2 may be brought into contact with wax component 300 at a high temperature. When the high-temperature wax component 300 is brought into contact with moisture 200, moisture 200 may be rapidly vaporized to cause damage on capacitor element 2. As a result, in solid electrolytic capacitor 1X according to the comparative example, wax component 300 may affect capacitor element 2, and a characteristic change in capacitor element 2 may occur.

On the other hand, in solid electrolytic capacitor 1 according to the present exemplary embodiment, as illustrated in FIG. 4A, coating layer 6 is disposed between capacitor element 2 and outer packaging resin 3. Hence, it becomes difficult for wax component 300 contained in outer packaging resin 3 to be brought into contact with capacitor element 2, as compared to solid electrolytic capacitor 1X according to the comparative example. That is, coating layer 6 containing the fluorine compound, or coating layer 6 having the oil repellency, makes it difficult for wax component 300 to infiltrate from outer packaging resin 3 into capacitor element 2 as compared to solid electrolytic capacitor 1X. In particular, in the present exemplary embodiment, coating layer 6 covers at least exposed area 51 of solid electrolyte layer 5 of capacitor element 2, so that wax component 300 contained in outer packaging resin 3 is easily prevented from being brought into contact with solid electrolyte layer 5. Thus, even if wax component 300 is heated to a high temperature when solid electrolytic capacitor 1 is exposed to a high-temperature environment, moisture 200 contained in capacitor element 2 and high-temperature wax component 300 is hardly brought into contact with each other in the first place. As a result, in solid electrolytic capacitor 1 according to the present exemplary embodiment, wax component 300 hardly affects capacitor element 2, and the characteristic change in capacitor element 2 hardly occurs.

In particular, in the present exemplary embodiment, the content of moisture 200 in capacitor element 2 is reduced by the drying step of capacitor element 2 (see "(3) Manufacturing method"). Thus, in solid electrolytic capacitor 1 according to the present exemplary embodiment, the amount of moisture 200 contained in capacitor element 2 is small in the first place, and moisture 200 contained in capacitor element 2 and high-temperature wax component 300 is more hardly brought into contact with each other.

By comparing solid electrolytic capacitor 1 according to the present exemplary embodiment with solid electrolytic capacitor 1X according to the comparative example, comparison results as shown in Table 1 below were obtained. Table 1 represents an occurrence rate of defective products due to a leakage current (LC) as "LC defect rate [%]," a number of damages caused to capacitor element 2 as "Damage of element [number of portions damaged]," and a result of a reliability test as "Reliability test [%]." The results of the reliability test represent a rate of change [%] from an initial value when a sample (solid electrolytic capacitor 1, 1X) was heated to 125° C. for four items of "ΔC," "Δ tan δ," "ΔESR," and "ΔLC." "ΔC" represents a rate of change in capacitance, "Δ tan δ" represents a rate of change in tan δ (dielectric dissipation factor), "ΔESR" represents a rate of change in equivalent series resistance, and "ΔLC" represents a rate of change in leakage current.

TABLE 1

| | LC defect rate [%] | Damage of element [number of portions damaged] | Reliability test [%] | | | |
|---|---|---|---|---|---|---|
| | | | ΔC | Δtan δ | ΔESR | ΔLC |
| Comparative Example | 24 | 24 | −3.34 | 398.8 | 78.9 | 51.2 |
| Embodiment | 4 | 2 | −0.34 | 29.7 | 16.2 | 8.03 |

As is also clear from Table 1 above, solid electrolytic capacitor 1 according to the present exemplary embodiment is improved in all items as compared to solid electrolytic capacitor 1X according to the comparative example. Particularly, it is clear from the results of the reliability test that in solid electrolytic capacitor 1 according to the present exemplary embodiment, a characteristic change ("ΔC," "Δ tan δ," "ΔESR," and "ΔLC") in capacitor element 2 hardly occurs as compared to solid electrolytic capacitor 1X according to the comparative example.

(5) Modifications

The first exemplary embodiment is only one of the various exemplary embodiments of the present disclosure. Various modifications can be made in the first exemplary embodiment in accordance with a design or the like so long as the object of the present disclosure can be achieved. Modifications described below are applicable in combination as appropriate.

Solid electrolytic capacitor 1 is not limited to a two-terminal structure with the two terminals of first terminal 71 and second terminal 72 but may have a structure with three or more terminals.

Solid electrolyte layer 5 is not limited to the conductive polymer, but may be, for example, manganese dioxide, an organic semiconductor, or the like.

Coating layer 6 only needs to be disposed between capacitor element 2 and outer packaging resin 3, and it is not an essential configuration for solid electrolytic capacitor 1 that coating layer 6 is formed directly on the surface of capacitor element 2. As an example, a protective layer made of polyamide resin, polyimide resin, polyimide silicone resin, ceramic, or the like may be formed on the surface of capacitor element 2, and coating layer 6 may be formed on the surface of the protective layer. In this case, the protective layer preferably covers at least exposed area 51 of solid electrolyte layer 5 as in the case of coating layer 6. On the contrary, coating layer 6 may be formed on the surface of capacitor element 2, and the protective layer may be formed on the surface of coating layer 6.

Outer packaging resin 3 does not need to constitute the outermost shell of solid electrolytic capacitor 1, and outer packaging resin 3 may be further covered with another resin member by double molding (two-color molding) or the like, for example.

The number of capacitor elements 2 included in solid electrolytic capacitor 1 is not limited to seven, but for example, capacitor elements 2, the number of which is between two and ten (inclusive), may be stacked.

Further, it is not an essential configuration for solid electrolytic capacitor 1 that solid electrolyte layer 5 and cathode layer 8 are formed on each of both surfaces of anode body 4 in capacitor element 2 in the thickness direction, but, for example, solid electrolyte layer 5 and cathode layer 8 may be formed only on one surface of anode body 4 in the thickness direction.

The resin coating step of forming coating layer 6 is not limited to being performed after the element stacking step, but may be performed, for example, after the cathode application step and before the element stacking step. The method of forming coating layer 6 is not limited to the application, but coating layer 6 may be formed by, for example, a method of sticking a resin sheet containing a fluorine compound to the surface of capacitor element 2.

Anode-side conductive part 42 is not limited to aluminum, but may be, for example, tantalum or the like. The shape of anode body 4 (anode-side conductive part 42 and dielectric layer 41) is not limited to the flat plate shape, but may be, for example, a porous sintered body made of valve metal powder.

(Summary)

As described above, solid electrolytic capacitor (1) according to a first aspect includes at least one capacitor element (2), outer packaging resin (3), and coating layer (6). Capacitor element (2) includes anode body (4) including dielectric layer (41), and solid electrolyte layer (5) at least partially covering dielectric layer (41). Outer packaging resin (3) covers capacitor element (2). Coating layer (6) is disposed between capacitor element (2) and outer packaging resin (3). Coating layer (6) contains a fluorine compound.

According to this aspect, since coating layer (6) is disposed between capacitor element (2) and outer packaging resin (3), it becomes difficult for the oil contained in outer packaging resin (3) to be brought into contact with capacitor element (2) as compared to a configuration without coating layer 6. That is, coating layer (6) containing the fluorine compound makes it difficult for the oil content to infiltrate from outer packaging resin (3) into capacitor element (2). Hence, for example, in a case where solid electrolytic capacitor (1) is exposed to a high-temperature environment or in some other case, even if the oil content in outer packaging resin (3) is heated to a high temperature, the oil content hardly affects capacitor element (2), and thus a characteristic change in capacitor element (2) hardly occurs.

Solid electrolytic capacitor (1) according to a second aspect includes at least one capacitor element (2), outer packaging resin (3), and coating layer (6). Capacitor element (2) includes anode body (4) including dielectric layer (41), and solid electrolyte layer (5) at least partially covering dielectric layer (41). Outer packaging resin (3) covers capacitor element (2). Coating layer (6) is disposed between capacitor element (2) and outer packaging resin (3). Coating layer (6) has oil repellency.

According to this aspect, since coating layer (6) is disposed between capacitor element (2) and outer packaging resin (3), it becomes difficult for the oil contained in outer packaging resin (3) to be brought into contact with capacitor element (2) as compared to a configuration without coating layer 6. That is, coating layer (6) having the oil repellency makes it difficult for oil content to infiltrate from outer packaging resin (3) into capacitor element (2). Hence, for example, in a case where solid electrolytic capacitor (1) is exposed to a high-temperature environment or in some other case, even if the oil content in outer packaging resin (3) is heated to a high temperature, the oil content hardly affects capacitor element (2), and thus the characteristic change in capacitor element (2) hardly occurs.

In solid electrolytic capacitor (1) according to a third aspect, in the first or second aspect, outer packaging resin (3) contains wax component (300).

According to this aspect, wax component (300) can be expected to have effects such as an improvement in mold releasability at the time of molding outer packaging resin (3) and glazing of outer packaging resin (3). Further, coating layer (6) disposed between capacitor element (2) and outer packaging resin (3) makes it difficult for wax component (300) to be brought into contact with capacitor element (2).

In solid electrolytic capacitor (1) according to a fourth aspect, in any one of the first to third aspects, capacitor element (2) further includes cathode layer (8) that at least partially covering solid electrolyte layer (5). Solid electrolyte layer (5) includes exposed area (51) not covered with cathode layer (8). Coating layer (6) covers at least exposed area (51).

According to this aspect, the infiltration of the oil into exposed area (51), in which the oil infiltration tends to affect the characteristics of capacitor element (2), hardly occurs in coating layer (6).

In any one of the first to fourth aspects, solid electrolytic capacitor (1) according to a fifth aspect includes a plurality of capacitor elements (2). A structure in which the plurality of capacitor elements (2) are stacked to each other is covered with one outer packaging resin (3).

According to this aspect, with one outer packaging resin (3) covering the plurality of capacitor elements (2), outer packaging resin (3) can relieve stress or the like acting between the plurality of capacitor elements (2).

In solid electrolytic capacitor (1) according to a sixth aspect, in the fifth aspect, a pair of capacitor elements (2) adjacent to each other among the plurality of capacitor elements (2) are jointed at junction portion (20). Coating layer (6) is formed at least partially on an area junction portion (20), which is a part of the surface of each of the plurality of capacitor elements (2).

According to this aspect, since coating layer (6) is formed in the area excluding junction portion (20), problems such as the lowering of the joining strength of junction portion (20) due to the action of coating layer (6) on junction portion (20) are unlikely to occur.

In solid electrolytic capacitor (1) according to a seventh aspect, in the fifth or sixth aspect, coating layer (6) is disposed at least partially between a pair of capacitor elements (2) adjacent to each other among the plurality of capacitor elements (2).

According to this aspect, since coating layer (6) also exists in a gap between the pair of capacitor elements (2) adjacent to each other, the oil contained in outer packaging resin (3) is hardly brought into contact with capacitor elements (2).

In solid electrolytic capacitor (1) according to an eighth aspect, in any one of the first to seventh aspects, coating layer (6) has the oil repellency with a contact angle greater than or equal to 50 degrees.

According to this aspect, with coating layer (6) having sufficient oil repellency, the oil more hardly infiltrates from outer packaging resin (3) into capacitor element (2).

In solid electrolytic capacitor (1) according to a ninth aspect, in any one of the first to eighth aspects, anode body (4) includes anode-side conductive part (42) having a flat plate shape and dielectric layer (41) disposed on at least one surface in the thickness direction of anode-side conductive part (42).

According to this aspect, anode body (4) has the flat plate shape, so that the height or the thickness of solid electrolytic capacitor (1) can be reduced.

In solid electrolytic capacitor (1) according to a tenth aspect, in any one of the first to ninth aspects, solid electrolyte layer (5) contains a conductive polymer.

According to this aspect, the equivalent series resistance can be held low.

The configurations according to the second to tenth aspects are not essential configurations for solid electrolytic capacitor (1), but may be omitted as appropriate.

What is claimed is:

1. A solid electrolytic capacitor comprising:
   a stack body in which a plurality of capacitor elements are stacked to each other;
   a terminal connected to the stack body; and
   an outer packaging resin covering the stack body and the terminal so that at least part of the terminal is exposed from a surface of the outer packaging resin, wherein:
   a pair of capacitor elements adjacent to each other among the plurality of capacitor elements are joined at a junction portion,
   each of the plurality of capacitor elements includes an anode body that includes a dielectric layer and an anode drawing part exposed from the dielectric layer, a solid electrolyte layer that at least partially covers the dielectric layer, and a cathode layer that at least partially covers the solid electrolyte layer,
   a coating layer is disposed between the solid electrolyte layer and the outer packaging resin, the coating layer containing a fluorine compound,
   a surface of the solid electrolyte layer has an exposed area that is not covered with the cathode layer,
   in a surface of the each of the plurality of capacitor elements, the anode drawing part, the exposed area, and the cathode layer are disposed in order in a longitudinal direction of the each of the plurality of capacitor elements,
   the exposed area is an area from an end edge of the solid electrolyte layer at a side close to the anode drawing part to an end edge of the cathode layer, and
   the coating layer covers at least the exposed area and an entirety of an outer surface of the stack body other than the junction portion and a first region, the first region being connected to the terminal.

2. The solid electrolytic capacitor according to claim 1, wherein the outer packaging resin includes a wax component.

3. The solid electrolytic capacitor according to claim 1, wherein the coating layer is disposed at least partially between the pair of capacitor elements adjacent to each other among the plurality of capacitor elements.

4. The solid electrolytic capacitor according to claim 1, wherein the coating layer has oil repellency with a contact angle greater than or equal to 50 degrees.

5. The solid electrolytic capacitor according to claim 1, wherein the anode body includes an anode-side conductive part having a flat plate shape and the dielectric layer disposed on at least one surface in a thickness direction of the anode-side conductive part.

6. The solid electrolytic capacitor according to claim 1, wherein the solid electrolyte layer includes a conductive polymer.

7. A solid electrolytic capacitor comprising:
   a stack body in which a plurality of capacitor elements are stacked to each other;
   a terminal connected to the stack body; and
   an outer packaging resin covering the stack body and the terminal so that at least part of the terminal is exposed from a surface of the outer packaging resin, wherein:
   a pair of capacitor elements adjacent to each other among the plurality of capacitor elements are joined at a junction portion,
   each of the plurality of capacitor elements includes an anode body that includes a dielectric layer, and an anode drawing part exposed from the dielectric layer, a solid electrolyte layer that at least partially covers the dielectric layer, and a cathode layer that at least partially covers the solid electrolyte layer,
   a coating layer is disposed between the solid electrolyte layer and the outer packaging resin, the coating layer having oil repellency,
   a surface of the solid electrolyte layer has an exposed area that is not covered with the cathode layer,
   in a surface of the each of the plurality of capacitor elements, the anode drawing part, the exposed area, and the cathode layer are disposed in order in a longitudinal direction of the each of the plurality of capacitor elements,
   the exposed area is an area from an end edge of the solid electrolyte layer at a side close to the anode drawing part to an end edge of the cathode layer, and
   the coating layer covers at least the exposed area and an entirety of an outer surface of the stack body other than the junction portion and a first region, the first region being connected to the terminal.

8. The solid electrolytic capacitor according to claim 7, wherein the outer packaging resin includes a wax component.

9. The solid electrolytic capacitor according to claim 7, wherein the coating layer is disposed at least partially between the pair of capacitor elements adjacent to each other among the plurality of capacitor elements.

10. The solid electrolytic capacitor according to claim 7, wherein the coating layer has oil repellency with a contact angle greater than or equal to 50 degrees.

11. The solid electrolytic capacitor according to claim 7, wherein the anode body includes an anode-side conductive part having a flat plate shape and the dielectric layer disposed on at least one surface in a thickness direction of the anode-side conductive part.

12. The solid electrolytic capacitor according to claim 7, wherein the solid electrolyte layer includes a conductive polymer.

13. A solid electrolytic capacitor comprising:
a stack body in which a plurality of capacitor elements are stacked to each other; and
an outer packaging resin covering the stack body, wherein:
a pair of capacitor elements adjacent to each other among the plurality of capacitor elements are joined at a junction portion,
each of the plurality of capacitor elements includes an anode body that includes a dielectric layer, a solid electrolyte layer that at least partially covers the dielectric layer, and a cathode layer that at least partially covers the solid electrolyte layer,
the cathode layer includes a carbon layer and a cathode-side conductive part that are stacked in this order from the dielectric layer,
a coating layer is disposed between the solid electrolyte layer and the outer packaging resin, the coating layer containing a fluorine compound,
the anode body includes an anode-side conductive part having a plate shape and the dielectric layer disposed on at least part of a first surface of the anode-side conductive part, the first surface being perpendicular to a thickness direction of the anode-side conductive part,
the coating layer covers at least part of a second surface of the solid electrolyte layer, the second surface being opposed to the first surface and located at a side far from the anode body, and
the coating layer further covers at least part of a first area in an outer surface of the cathode-side conductive part covering the second surface of the solid electrolyte layer, the first area facing the junction portion.

14. The solid electrolytic capacitor according to claim 13, wherein the outer packaging resin includes a wax component.

15. The solid electrolytic capacitor according to claim 13, wherein:
the solid electrolyte layer has an exposed area that is not covered with the cathode layer, and
the coating layer covers at least the exposed area.

16. The solid electrolytic capacitor according to claim 13, wherein
the coating layer is formed at least partially on an area other than the junction portion, the area being a part of a surface of each of the plurality of capacitor elements.

17. The solid electrolytic capacitor according to claim 13, wherein:
the plurality of capacitor elements includes a first capacitor element and a second capacitor element which are adjacent to each other, and
the coating layer is disposed at least partially between the second surface of the solid electrolyte layer in the first capacitor element and the second surface of the solid electrolyte layer in the second capacitor element.

18. The solid electrolytic capacitor according to claim 13, wherein the coating layer has oil repellency with a contact angle greater than or equal to 50 degrees.

19. The solid electrolytic capacitor according to claim 13, wherein the solid electrolyte layer includes a conductive polymer.

20. A solid electrolytic capacitor comprising:
a stack body in which a plurality of capacitor elements are stacked to each other; and
an outer packaging resin covering the stack body, wherein:
a pair of capacitor elements adjacent to each other among the plurality of capacitor elements are joined at a junction portion,
each of the plurality of capacitor elements includes an anode body that includes a dielectric layer a solid electrolyte layer that at least partially covers the dielectric layer, and a cathode layer that at least partially covers the solid electrolyte layer,
the cathode layer includes a carbon layer and a cathode-side conductive part that are stacked in this order from the dielectric layer,
a coating layer is disposed between the solid electrolyte layer and the outer packaging resin, the coating layer having oil repellency,
the anode body includes an anode-side conductive part having a plate shape and the dielectric layer disposed on at least part of a first surface of the anode-side conductive part, the first surface being perpendicular to a thickness direction of the anode-side conductive part,
the coating layer covers at least part of a second surface of the solid electrolyte layer, the second surface being opposed to the first surface and located at a side far from the anode body, and
the coating layer further covers at least part of a first area in an outer surface of the cathode-side conductive part covering the second surface of the solid electrolyte layer, the first area facing the junction portion.

21. The solid electrolytic capacitor according to claim 20, wherein the outer packaging resin includes a wax component.

22. The solid electrolytic capacitor according to claim 20, wherein:
the solid electrolyte layer has an exposed area that is not covered with the cathode layer, and
the coating layer covers at least the exposed area.

23. The solid electrolytic capacitor according to claim 20, wherein
the coating layer is formed at least partially on an area other than the junction portion, the area being a part of a surface of each of the plurality of capacitor elements.

24. The solid electrolytic capacitor according to claim 20, wherein:
the plurality of capacitor elements includes a first capacitor element and a second capacitor element which are adjacent to each other, and
the coating layer is disposed at least partially between the second surface of the solid electrolyte layer in the first capacitor element and the second surface of the solid electrolyte layer in the second capacitor element.

25. The solid electrolytic capacitor according to claim 20, wherein the coating layer has oil repellency with a contact angle greater than or equal to 50 degrees.

26. The solid electrolytic capacitor according to claim 20, wherein the solid electrolyte layer includes a conductive polymer.

* * * * *